INVENTOR.
EDWARD J. WINDLE

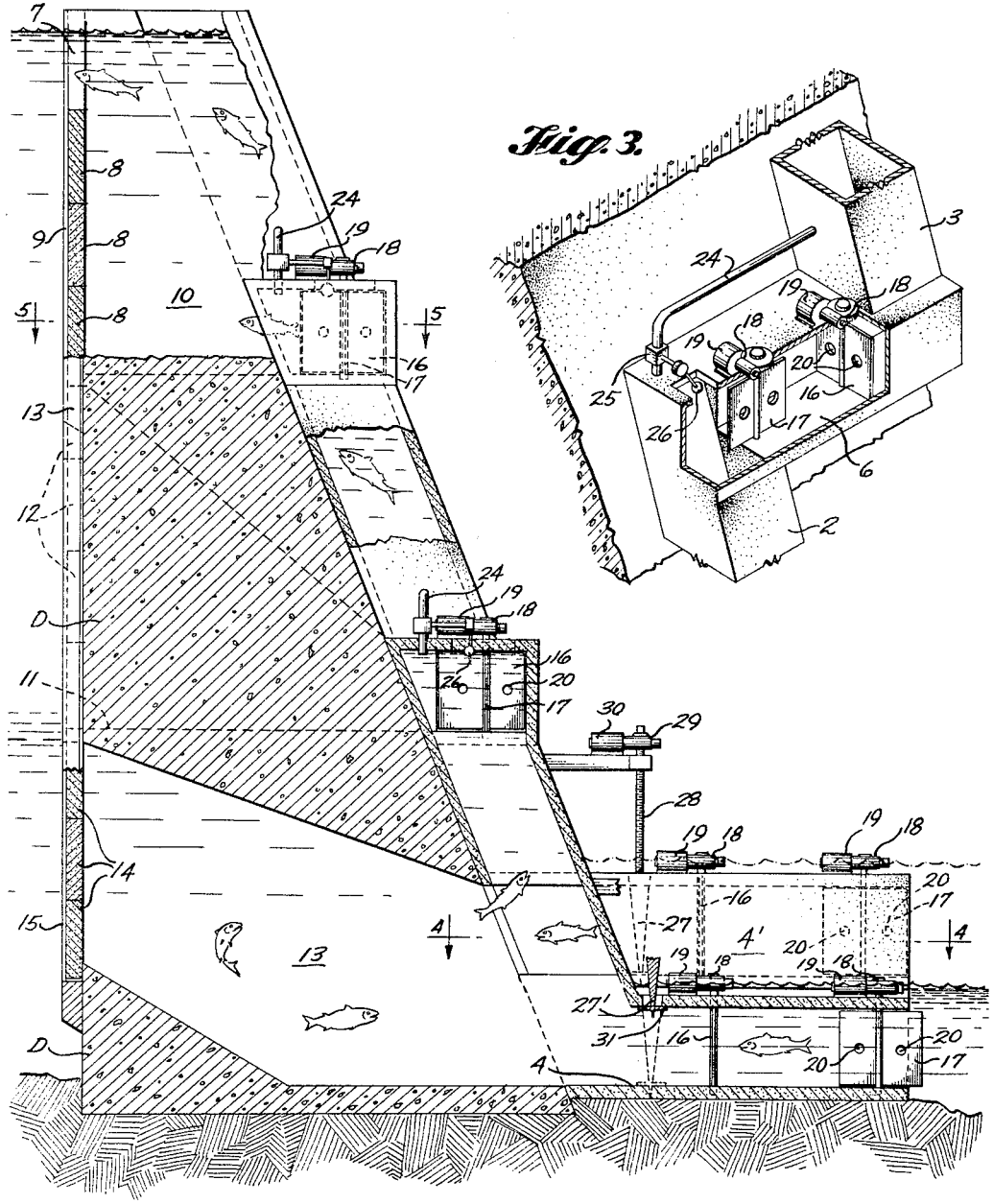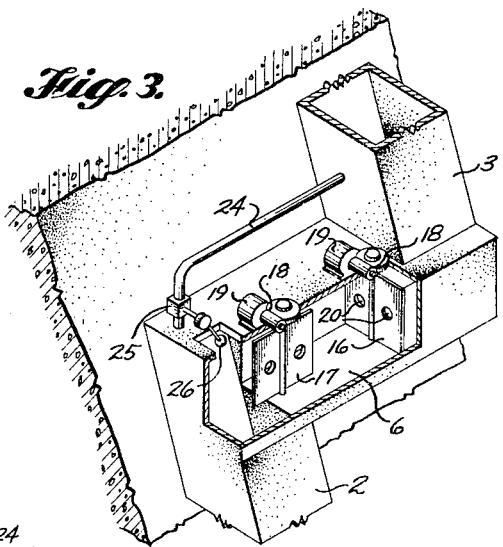

Feb. 1, 1966 E. J. WINDLE 3,232,060
ALTERNATING INTERRUPTED PASSAGE FISHWAY
Filed Sept. 10, 1962 3 Sheets-Sheet 3
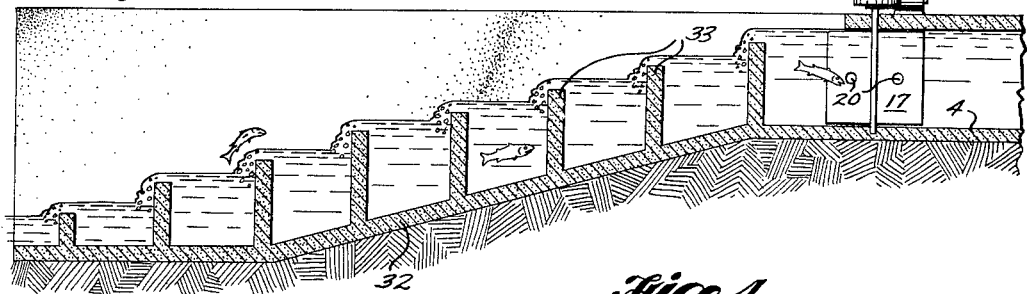
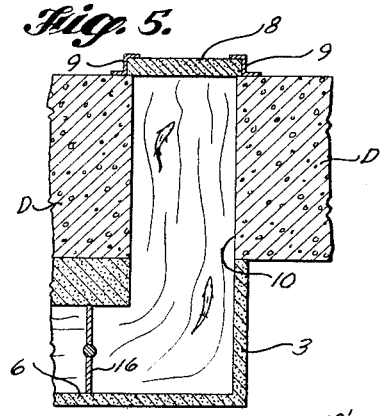
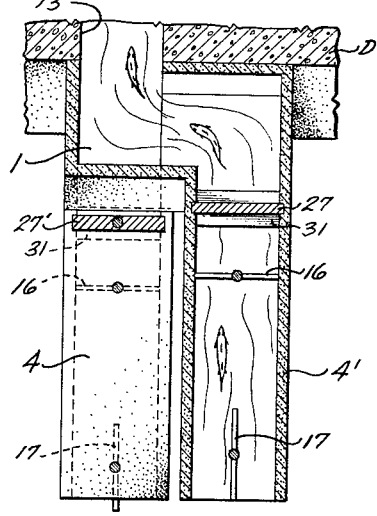
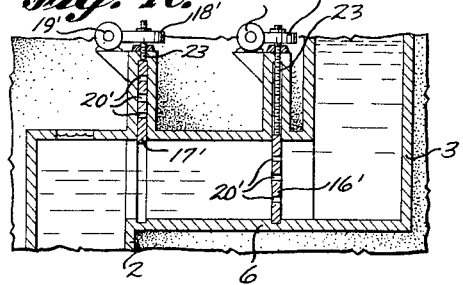
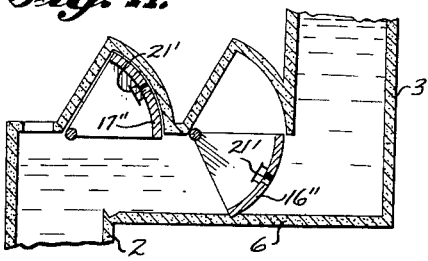
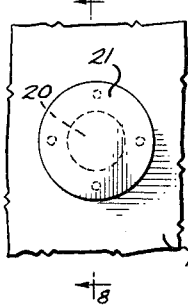
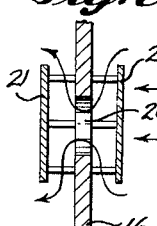
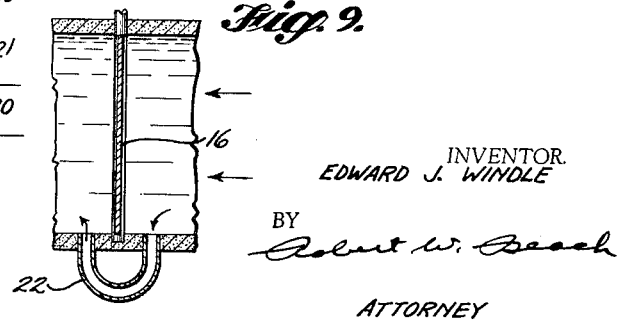
INVENTOR.
EDWARD J. WINDLE
BY
Robert W. Beach
ATTORNEY United States Patent Office 3,232,060
Patented Feb. 1, 1966

3,232,060
ALTERNATING INTERRUPTED PASSAGE
FISHWAY
Edward J. Windle, Rte. 1, Box 184M, Nehalem, Oreg.
Filed Sept. 10, 1962, Ser. No. 222,456
5 Claims. (Cl. 61—21)

The present invention relates to a fishway, the passage through which is interrupted at all times by a barrier but the location of such barrier alternates from one position to another.

A principal object of the invention is to facilitate the upstream migration of fish, and particularly salmon, to spawning grounds in the upper reaches of a river by providing a passage which will enable fish to migrate easily, although not continuously. During such migration of the fish it is an object to avoid injury to them and to minimize the exertion required for such migration, such as by enabling the fish to ascend the height of the dam by easy stages.

To insure effective use of the fishway it is an object to provide continual flow of water from the upstream end to the downstream end of sufficient volume to impel the fish to swim in an upstream direction. Despite such continual flow of water it is an object to keep elevating portions of the fishway filled with water to provide continuous passage for fingerlings downstream and progressive upstream migration.

Another object is to provide such a fishway which can be added economically to an existing dam as an accessory and which, whether added as an accessory or designed as an integral part of the dam at the time of its construction, will be relatively inexpensive and simple to construct.

A further object is to provide a fishway which is compact, is reliable and largely automatic in operation and which requires a minimum amount of maintenance. Moreover, the fishway is versatile in being adapted to accommodate its operation to a dam despite great variation in the level of the water stored behind the dam.

The objects of the invention can be accomplished by a fishway including a passage through which a small amount of water will flow continuously from the upstream side of the dam to the downstream side, but the principal opening through which will be interrupted alternately at one location or another to define an upstream section and a downstream section which are in open communication alternately with an intermediate transverse section, so that fish may swim from the downstream section into the transverse section while communication between the transverse section and the upstream section is interrupted and subsequently fish may swim from the transverse section into the upstream section when communication between the transverse section and the upstream section has been established following interruption of communication between the downstream section and the transverse section. The fishway can include a plurality of risers arranged in series and joined by connecting passages, each of which connecting passages includes a downstream section, an upstream section, an intermediate transverse section and flow controlling mechanism for interrupting the fish migrating communication between the downstream section and the transverse section, and between the transverse section and the upstream section alternately.

FIGURE 2 is a vertical section through the dam and fishway with additional parts being broken away.

FIGURE 3 is a top perspective of a fragmentary portion of the dam and fishway structure, parts being broken away.

FIGURE 4 is a horizontal section through a portion of the fishway taken on line 4—4 of FIGURE 2, and FIGURE 5 is a horizontal section through a portion of the fishway taken on line 5—5 of FIGURE 2.

FIGURE 6 is a vertical section through an alternative type of entrance construction which may be provided for the fishway of the present invention.

FIGURE 7 is an elevation of a fragmentary portion of valve construction which may be used in the fishway.

FIGURE 8 is a transverse section through the valve structure taken on line 8—8 of FIGURE 7.

FIGURE 9 is a fragmentary section through a portion of the fishway showing a modified type of construction.

FIGURE 10 is a vertical section through a portion of the fishway showing an alternative type of valve structure, and FIGURE 11 is a similar view showing a further valve structure modification.

Figure 1:
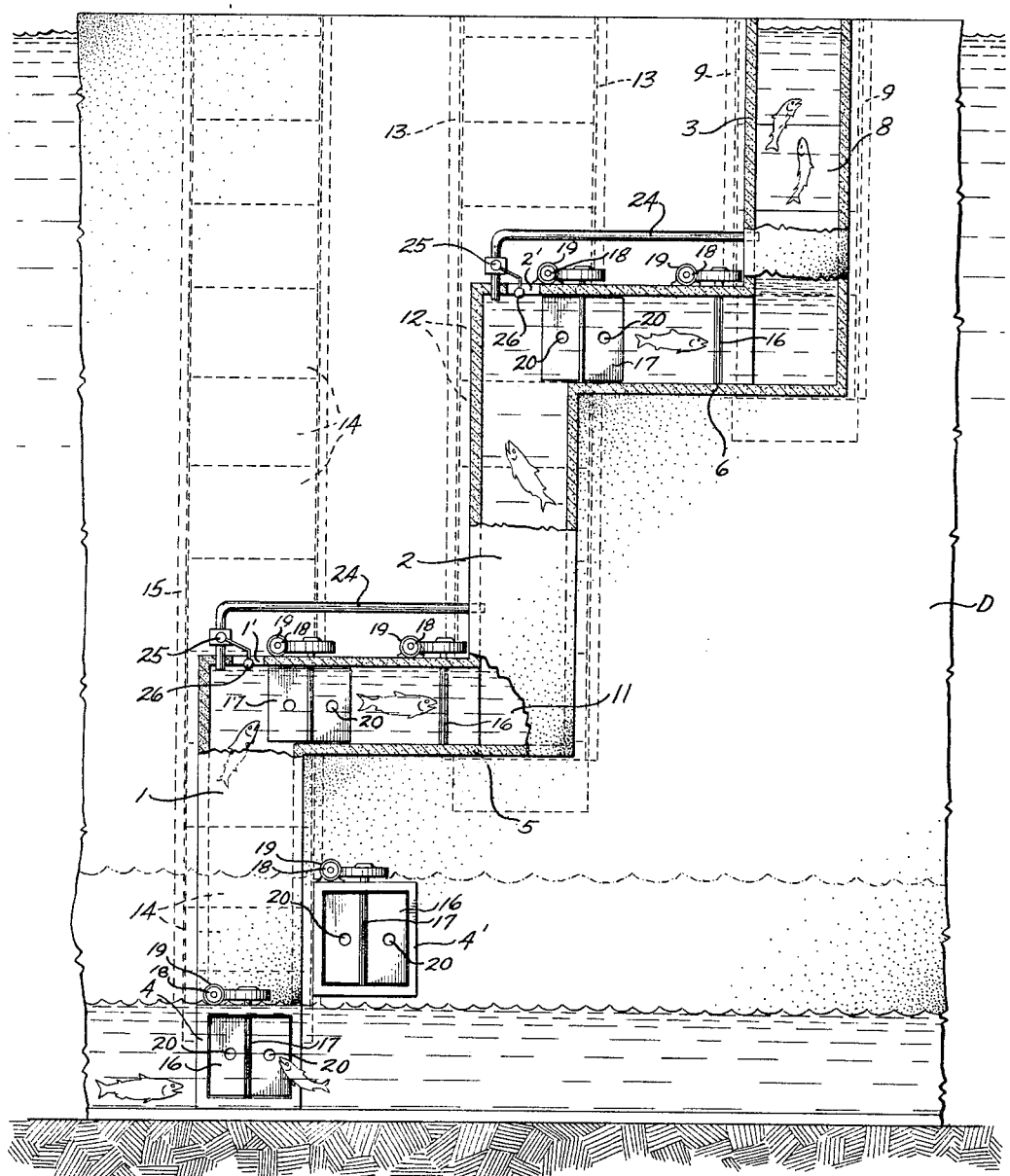
FIGURE 1 is an elevation of a portion of the downstream face of a dam incorporating a fishway of the present invention, parts being broken away.

To facilitate the migration of fish from one side of a high dam to the other various types of fishway structures have been proposed, but many of them are not very practical or effective and many are quite expensive. The fishway of the present invention is adapted for transfer of fish directly through a dam approximately at a single level, or for movement of fish from one level to a much higher level in any desired number of stages. In FIGURE 1 a representative fishway installation is shown which includes three risers 1, 2 and 3, the combined vertical extent of which is equal to the height of the dam D. A substantially horizontal entrance section 4 is connected to the lower end of the riser 1, a generally horizontal passage 5 connects the upper end of the riser 1 and the lower end of the riser 2 and a generally horizontal passage 6 connects the upper end of the riser 2 and the lower end of the riser 3. The upper end of the riser 3 communicates with the upstream side of the dam through the outlet passage 7.

While the fishway illustrated in FIGURES 1 and 2 is shown as including three risers and three generally horizontal passage sections, it should be understood that depending upon the height of the dam it may be desirable to provide a larger number or a smaller number of risers. It is preferred that each riser extend through an elevation of 50 to 100 feet in order that a fish not be subjected to an undesirably great hydraulic pressure. If the dam is sufficiently low, however, or if the water behind the dam is sufficiently low, it is not necessary to utilize as many risers or perhaps no risers at all. Passages as alternates for outlet passage 7 may be provided for communication with lower portions of the fishway when the water behind the dam is at different levels.

In FIGURE 2 stop logs 8 slidable in channel guides 9 are shown filling the lower portion of the deep notch in the upper edge of the dam constituting the outlet passage 7. As the water behind the dam is lowered one after another of these stop logs 8 can be lifted upward out of the guideways to provide an outlet from the upstream face of the dam at correspondingly progressively lower levels. The entire height of the riser 3 is in communication with the deep notch 10 so that fish may swim from any portion of the riser into the deep notch 10 and out from any portion of it which is unobstructed.

If the level of the water behind the dam D should drop below the bottom of the deep notch forming the outlet passage 7 fish may swim directly from the generally horizontal connecting passage 5 through an alternate outlet passage slot 11 extending through the dam in registry with the riser 2. Such alternate outlet slot is indicated in broken lines in FIGURES 1 and 2 and it is shown as being completely closed at the upstream side of the dam by stop logs 12 slidable vertically in channelways 13 mounted on the upstream face of the dam. Preferably the portion of this slot at the upstream dam face is of a vertical extent equal to the elevational height of the riser 2. The depth of the slot opening can be varied to the extent desired by lifting out as many or as few of the stop logs 12 as may be desired.

If the water behind the dam D should drop still lower the fish may escape from the fishway through a still lower outlet passage slot 13 extending through the lower portion of the dam in communication with the entrance passage section 4. The discharge end of this outlet passage forms a slot in the upstream face of the dam in registry with and of a vertical height approximately equal to the height of the riser 1. This slot is closed by stop logs 14 slidable in guideways 15 which are secured to the face of the dam in alignment with the slot of outlet passage 13. Again, as many of the stop logs 14 can be withdrawn from the guideways as desired in order to provide an outlet opening corresponding to the level to which the water behind the dam may drop from time to time.

It is evident that the level of the water on the upstream side of the dam D almost invariably will be at a level higher than the water on the downstream side of the dam. Consequently, water will tend to flow from the upstream side of the dam through the fishway to the downstream side of the dam, but water would tend to flow out of the fishway to empty it if such action were not prevented in some way. Particularly where the height of the water level behind the dam is considerably greater than the height of the water level on the downstream side of the dam the water would tend to flow out of the risers 3, 2 and 1 so that they would be more or less empty even if water were supplied continually from the upstream side of the dam. Moreover, a large volume of water would be flowing at a high velocity through the fishway which would make it difficult for fish to progress from the downstream side of the dam to the upstream side of the dam against the current through the fishway.

In order to deter emptying of the fishway flow controlling means are provided in the fishway which will restrict the flow of water to it while at the same time preserving its utility for migration of fish from a location below the dam to a location above the dam. Control valve means are provided in at least one, and preferably in each, generally horizontal passage section of the fishway. Such control valve means is effective to provide an interrupted passage in which the interruption is effected by at least one of a plurality of valves spaced lengthwise of such passage. Two of such valves are sufficient to provide the desired type of control operation and these valves are arranged and controlled so that only one of these valves in a generally horizontal passage will be open at any given time. In order to induce fish to move toward the upstream end of the fishway, however, a limited amount of water will flow through the fishway and the controlling valve means at all times.

The preferred type of control valve means in a generally horizontal passage of the fishway are shown in FIGURES 1, 2 and 3. The horizontal passage is illustrated as the connecting passage section 6, but the valve mechanism shown in FIGURES 1 and 2 is the same in the horizontal passage section 5 and in the entrance section 4, as it is in the section 6. In each instance such valve mechanism includes two similar valves, namely, an upstream valve 16 and a downstream valve 17, mounted in the generally horizontal passage in relationship spaced lengthwise of it. Each of these valves is of a size and shape substantially to close the passage. In FIGURES 1, 2 and 3 the horizontal passages are shown as being of rectangular cross section, preferably approximately square. The valves 16 and 17 are shown as being of the butterfly type and rectangular complemental to the cross-sectional shape of the passage. The valve pivots are upright and each valve may swing about its pivot in opposite directions, or the valve may be rotatable in a single direction if the valve is sufficiently small to provide clearance between its edges and the sides of the passage as the valve is rotated. The valves can be turned by worm gear mechanism 18 driven by a motor 19 in each instance, which worm gear is mounted on the valve axle.

As has been mentioned above, the purpose of the double valve arrangement is to maintain the fishway passage substantially filled with water at all times. When the valves 16 are closed and the valves 17 are open, as shown in FIGURE 1, the valves 16 serve to maintain the head of water on the upstream side of such valves. Thus, the valve 16 in the entrance passage 4 maintains the head of water in that portion of the entrance passage upstream from the valve, in the riser 1 and in that portion of the generally horizontal connecting passage 5 downstream from the valve 16 in it. There is no problem of maintaining water in the portion of the entrance passage downstream from valve 16 because, as shown in FIGURES 1 and 2, it is submerged in the water below the dam. Similarly, the valve 16 in connecting passage 5 maintains the head of water in that portion of such passage upstream from this valve, in riser 2 and in the portion of the generally horizontal connecting passage 6 downstream from its valve 16. The valve 16 in this passage maintains the head of water in that portion of passage 6 upstream from such valve and in the riser 3.

A problem couls arise as to designing the control valves so that they would fit tightly to prevent any passage of water past them, but it would be difficult for such a valve to rotate completely around its axis if it were of the butterfly type. Actually, it is preferable for the water in the fishway to have a small volume, continuous flow apart from the action of the valves, so that not only is it unnecessary for the valves to fit tightly but provision is made for maintaining an appreciable continual flow of water from one side of each closed valve to the other. In this way an appreciable flow of water down through the entire fishway will be maintained at all times which will impel migrating fish to swim against the current of such water from a downstream portion of the fishway toward an upstream portion of the fishway until they have passed through the entire fishway.

The flow of water from the upstream side of each closed valve to its downstream side can be effected in various ways. Each valve could, for example, simply be made slightly smaller than the cross section of the fishway in which it is mounted, but because the perimeter of the valve is of considerable length a small variation in the width of passage between the valve edge and the fishway would cause a considerable variation in the passage of water. Consequently, it is preferred that each valve fit quite closely the portion of the passageway in which it is mounted and that positive means be provided for effecting a continual flow of water past each closed valve. Where the butterfly type of valve is used a port 20 may be provided in each wing of a size to produce the desired amount of bleed from the upstream side of the valve to the downstream side taking into consideration the effective head of water behind such valve. In order to provide uniform flow of water throughout the length of the fishway it is desirable that each stage or step of the fishway be of approximately the same height so that each valve 16 will be subjected to approximately the same head. Fingerlings can migrate downstream through such ports.

Provision of a single bleed port through each wing of a butterfly valve 16 may produce an undesirable jet action if the head of water upstream from the valve is quite large. However, as stated hereinbefore, sufficient riser assemblies are provided in a dam to minimize the upstream head of water and the jet action therefore is consequently of little concern. Such jet streams are quickly diffused by water resistance. It may be desirable to mount a baffle plate 21 on the downstream side of each valve plate at a location spaced sufficiently from the plate so that the flow of water through the bleed port will be more rapidly diffused. Preferably, as shown in FIGURES 7 and 8, such baffle plate is somewhat larger than the bleed port itself so that it will be necessary for water flowing through the bleed port to move generally parallel to the valve plate and transversely of the general direction of flow of water through the fishway. Water passing through the bleed port will thus be deflected generally radially outward to enlarge its flow pattern, and also flow past the flat baffle plate 21 will produce turbulence at its downstream side. Such diversion of the water flowing through the bleed port will diffuse the water current so as to reduce such current to a satisfactory value. If, as preferred, the butterfly valve is of the type which can be rotated unidirectionally so that its opposite sides alternate between an upstream position and a downstream position as the valve is turned, it will be desirable to provide baffle plates 21 on both sides of each bleed orifice, as shown in FIGURE 8.

An alternative type of bleed port from the upstream side of a control valve to its downstream side is shown in FIGURE 9 as the bypass passage 22 connected between a portion of the fishway wall upstream from the valve 16 and a portion of such wall downstream from the valve 16. Diffusion of flow through such a bypass passage will be satisfactory because, as indicated in this figure, the discharge from the bypass is directed generally parallel to the valve and transversely of the general direction of flow of water through the fishway. Another type of diffusing bleed port arrangement is simply to provide a plurality of smaller ports through the valve at various locations, the aggregate opening through which will be approximately equal to the opening through the single bleed port 20, through the single bypass passage 22. Such a bleed port arrangement is particularly suitable if the control valves are of the gate valve type, such as the valves 16' and 17' shown in FIGURE 10, through which the plurality of bleed apertures 20' are provided. Such gate valves can be moved vertically by actuating screws 23 driven by worm gears 18' which are powered by motors 19'.

If a radial gate valve or tainter gate valve 16" and 17" is used, such as shown in FIGURE 11, a baffle plate 21' can be mounted on the downstream side of the valve if the valve is installed so that its convex surface is its upstream side, as shown in that figure. If such valves are installed so that their concave faces are their upstream faces, however, it is desirable to provide a number of smaller bleed ports distributed over the valves, such as utilized in the planar gate valves 16' and 17' of FIGURE 10, in order to produce the desired diffusion of flow of water from the upstream side of the valve to the downstream side.

As has been illustrated in FIGURES 1, 2, 3, 10 and 11, whatever specific type of control valve is utilized each valve installation includes a pair of valves spaced lengthwise of the fishway to provide between them a transverse generally horizontal section of fishway in which each valve when closed while the other valve is open will be subjected to the same head of water. In each of the figures mentioned the upstream valve 16, 16' or 16" is shown as being closed to interrupt fish migrating passage from the intervalve transverse section of the fishway to the section of the fishway upstream from the closed valve, while the valve 17, 17' or 17" is open to establish communication between the section of the fishway downstream from such valve and the intervalve transverse section of the fishway. As long as the valves are in the positions shown, therefore, fish can migrate freely from a riser past the valve 17, 17' or 17" into the intervalve transverse section of the fishway. While, for convenience of illustration, the valves 16 and 17, 16' and 17' and 16" and 17" are shown as being quite close together to illustrate the principle on which the fishway operates, it will be evident that such valves can be spaced as far apart as desired to provide an intervalve transverse section of any desired capacity.

When the valves 16, 16' and 16" are open and the valves 17, 17' and 17" are closed an appreciable continual flow of water through the entire length of the fishway will be maintained as before. With the valves in this position, however, fish may migrate freely from each intervalve transverse section of the fishway between adjacent valves 16 and 17, 16' and 17' and 16" and 17" into the section of the fishway upstream from the valves 16, 16' and 16", respectively, and into the next riser of the fishway. Fish swimming up through any riser cannot, however, pass the valve 17, 17' or 17" at its upper end into the next intervalve transverse section of the fishway except that fish swimming up the uppermost riser 3 can swim directly through the slot 10 and outlet passage 7 into the body of water at the upstream side of the dam. With the valves in this position, therefore, fish can accumulate in the upper portions of the several risers.

If all the valves in the fishway were in the open position at the same time the flow through the fishway would be comparable to a waterfall or a penstock which, if the fishway were of large enough cross-sectional area to constitute a convenient passage for fish, would have the double disadvantage of draining water stored above the dam undesirably rapidly and second, of having a current through it too rapid for fish to move through it easily. If at least one valve of a lower pair of valves were closed and both valves of an upper pair of valves were open at the same time the head of water adjacent to the upstream side of the lower closed valve would be undesirably great. On the other hand, if all of the valves downstream from a particular closed valve were in the open position simultaneously the water in the riser, or risers, below such closed valve would drain out instead of such risers remaining filled because the upper end of each riser has an opening in communication with the atmosphere, the upper end of riser 1 having the opening 1', the upper end of riser 2 having the opening 2' and the upper end of riser 3 being freely open.

It is an important feature of the operation of the present fishway, therefore, that a valve 16 or 17, for example, be in its open position only when the other valve of such pair is closed. It is desirable, however, that one valve or the other of each pair be open at substantially all times and it is further desirable that corresponding valves of all pairs be open simultaneously and the other corresponding valves of all pairs be closed simultaneously. Thus, as shown in FIGURES 1 and 2, the valve 16 of each pair of valves is shown in its closed position and the valve 17 of each valve pair is shown in its open position. At another time all of the valves 17 would be closed and all of the valves 16 would be open. Moreover, the valves 16 would be moved from closed to open position and the valves 17 would be moved from open to closed position at approximately the same time so that the fishway passage would be interrupted alternately by the valves 16 and by the valves 17.

During transition from the condition in which the valves 16 are closed and the valves are open to the condition in which the valves 16 are open and the valves 17 are closed it is important that the valves 16 and 17 of each pair not be partly open or fully open at the same time. It is not objectionable for both valves 16 and 17 of any particular pair to be both closed for a short period because since both valves have a bleed port for passage of water from the upstream side to the downstream side of the valve the continual flow of water through the fishway in a small quantity would be maintained unchanged even though both valves of one or all pairs of valves were closed. In changing from the condition in which valve 16 is closed and valve 17 is open to the condition in which valve 16 is open and valve 17 is closed, or vice versa, therefore, it is desirable that the open valve of the pair first be closed and then that the previously closed valve of such pair be opened.

While the various valves of the control valve mechanism could be arranged actually to be moved manually it is preferred that electric drive motors 19 or 19′ be provided to drive the valve moving mechanism such as the worm gears 18 or 18′ mentioned previously. Each of the electric motors 19 or 19′ could be controlled manually, if desired, to move the valves in the proper sequence, but it is preferred that all of the motors 19 or 19′ connected to move the valves 16 be interconnected for conjoint energization and deenergization and that all of the motors 19 or 19′ connected to drive the valves 17 be interconnected for energization and deenergization conjointly. Thus, all of the motors for valves 17 or 17′ or 17″ could be energized to close such valves and then deenergized followed by control of all of the motors connected to drive the valves 16, 16′ or 16″ first to energize such motors to open the valves and then to deenergize such motors. Alternatively, the motors 19 or 19′ thus interconnected could be controlled by suitable timing and sequence control mechanism so that such motors would be energized and deenergized in the sequence mentioned at desired predetermined intervals. At the end of any such interval the motors 19 or 19′ for valves 17, 17′ or 17″ would first be energized to close such valves, then such motors would be deenergized followed by energization of the motors to effect opening of valves 16, 16′ or 16″ and then these motors would be deenergized. At the end of the next time period the timing mechanism would energize and deenergize the appropriate motors first to close valves 16, 16′ or 16″ and then to open valves 17, 17′ or 17″.

As the water behind the dam decreases in height the head of water acting on the valve 16 or 16′ in the generally horizontal passage 6 would be decreased and consequently the flow of water which would bleed past the valve mechanism in this passage would be reduced, whereas the head of water acting on the valve mechanism in passages 5 and 4 would remain unchanged as long as the height of the water in riser 2 remained the same. Because of the decrease in head of water acting on the valve mechanism in the passage 6 the flow through such passage into the upper end of the riser 2 would not be as great as the flow out of this riser through the connecting passage 5 or out of riser 1 through the entrance passage 4. Consequently, the head of water in the riser 2 would tend to be depleted so as to destroy the interconnecting body of water between the upper end of riser 2 and the downstream end of passage 6. Similarly, if the head of water behind the dam D decreased sufficiently so that it would be part way down the height of riser 2 with some of the stop logs 12 being removed, the head of water acting on the valve mechanism in passage 5 would be less than the head of water acting on the valve mechanism in entrance passage 4 if the height of water behind the dam were sufficiently low and the water at the downstream side of the dam were sufficiently shallow. Conversely, if the height of the water below the dam were exceptionally great, as shown in broken lines at the right of FIGURE 2, and the height of the water behind the dam were at or near the top of the dam the pressure acting on the valve mechanism in passage 6 and in passage 5 might be greater than the pressure of the water acting on the valve mechanism in passage 4. Moreover, inequality of flow past the valve mechanism in one generally horizontal passage over that in another generally horizontal passage might occur because of differences in valve clearance, or for some other reason.

To be able to maintain proper control over the amount of water in each section of the fishway it is desirable to provide control mechanism in addition to the control valve mechanism in each of the generally horizontal passages which have been described above. The most important consideration is to insure that each of the risers in the fishway is maintained full of water at least to the height of the water behind the dam. This condition can be insured by making the bleed passage through each generally horizontal passage section slightly larger than the bleed passage through the next downstream control valve mechanism of the fishway. Thus, the bleed passage through the valve mechanism of connecting passage mechanism 6 could be slightly greater than the bleed passage through the valve mechanism of connecting passage section 5 and the bleed passage through this valve mechanism would be slightly larger than the bleed passage through the valve mechanism of the entrance passage 4. Such relationship of the size of bleed passage is predicated upon the head of water normally acting on all of the flow control valve mechanisms being approximately equal. If the heads of water differ the bleed passages should be correspondingly smaller for a higher head of water and correspondingly larger for a lower head of water acting upon the particular valve mechanism.

Alternatively, or additionally, the height of water in each riser can be maintained positively at a predetermined level, such as being filled completely. Such positive control mechanism is illustrated as including a supplemental water supply pipe 24 connected between the upper end of each riser and the lower end of the next higher riser. Flow through such pipe is controlled by a float valve including the valve 25 which is actuated by a float arm 26, the float of which floats on the surface of the water in the vent opening at the upper end of the riser. If the height of the water in the riser 1 should drop the float in the opening 1′ would follow it down to open the valve 25 enabling water to flow through the supply pipe 24 connected to the lower portion of the riser 2 into the upper end of riser 1 until the level of the water in that riser has been restored. Similarly, if the level of the water in riser 2 should drop, the float 26 extending through the opening 2′ in the upper end of this riser would drop to open its valve 25 and enable water to flow through the pipe 24 from the lower end of the riser 3 into the upper end of riser 2 until the level of water in such riser has been restored.

Provision is made for satisfactory operation of the fishway whatever may be the depth of the water above the dam, or below the dam. As has been discussed previously, slots are provided in the dam so that if the height of water behind the dam decreases stop logs 9, 12 and 14 can be removed as may be appropriate to provide communication with the fishway through coresponding slots 10, 11 and 13 of the dam. Alternatively, provision may be made to effect optimum operation of the dam during the flood season when the height of water behind the dam is maximum and there is sufficient flow over the spillway to increase the depth of the water below the dam, such as from the solid line position to the broken line position indicated in FIGURES 1 and 2. For this purpose a second entrance passage 4′, higher than the normal entrance passage 4, can be provided, as shown in FIGURES 1, 2 and 4.

The entrance passages 4 and 4′ will only be used alternatively, the one not in use at any particular time being blocked off. As shown in FIGURES 1 and 2, the lower entrance passage 4 is in operation and the upper entrance passage 4′ is closed positively by the gate valve 27, which can be raised and lowered by the screw 28 driven by the worm gear 29 which is powered by the motor 30. When this valve is opened so that the upper entrance passage is in use it is prefered that the lower entrance passage 4 be closed positively by a similar gate valve 27′. Provision of such a gate valve is not absolutely necessary, however, because flow through this passage at all times would be restricted by one or the other of the valves 16 and 17. The entrance passage 4′ also, of course, has in it a pair of control valves 16 and 17. It would be undesirable to control the flow through the optional entrance passage 4' simply by the valves 16 and 17 because water would be lost through the bleed passage of such entrance passage. If the water below the dam were sufficiently high to submerge both entrance passages, however, the head of water in the lower riser 1 effective to produce flow through the entrance passages would be decreased and consequently, the additional flow through the second entrance passage would not be particularly objectionable since makeup water, as might be necessary, would be supplied to the upper end of the riser 1, as described above.

If a gate valve 27' were provided to enable the entrance passage 4 to be closed positively when the entrance passage 4' is in use, it would be necessary to provide a closure plate 31 on the lower portion of the gate valve 27' to seal the port in the top of the entrance passage 4 through which the gate valve would be retracted and in which it would fit when in its closed position. Such a plate would be required in order to prevent loss of water from the riser 1 through this opening when the entrance passage 4 is in operation.

Instead of providing upper and lower entrance passages 4 and 4' which can communicate alternatively with the riser 1 depending upon the depth of water below the dam, a conventional fish ladder of the stepped type, as shown in FIGURE 6, leading into the entrance passage 4 can be provided. Such a fish ladder can have a sloping bottom 32 and a series of progressively higher wiers 33 which will enable fish to enter the entrance passage 4 at whatever level along the fish ladder the water below the dam may be. If such an arrangement is to be used the flow through the fishway should be sufficiently great to enable the fish ladder to be effective, or supplemental water should be provided to flow down the fish ladder.

When fish enter an entrance passage, either 4 or 4', past the open valve 17, 17' or 17" they will be stopped by the closed valve 16, 16' or 16" until the valve 17, 17' or 17" in the entrance passage has been closed behind the fish. The valve 16, 16' or 16" in the entrance passage will then be opened to enable the fish either to swim to the upper side of the dam through the slot 13 if one or more of the stop logs 14 closing this passage is removed, or the fish can swim up to the top of the riser 1 and into the connecting passage 5 as far as the closed valve 17. When the position of the valves 16 and 17 is reversed these fish can then move on into the intervalve section of passage 5 between valves 16 and 17. When these valves are reversed the fish can then progress on past valve 16 into riser 2. By such successive stages the fish eventually swim up to a slot in the dam where egress is provided through an aperture made by removal of stop logs, or the fish will reach the outlet passage at the top of the dam.

I claim as my invention:

1. A dam structure comprising an upright wall having downstream and upstream surfaces, one or more passages on the face of the dam in end to end relation extending between the upstream side and the downstream side for upstream migration of fish therethrough, said passages each comprising an upright portion and a substantially horizontal portion, flow controlling means in each passage including two valve members mounted in spaced relationship, each of said valve members being of a size and shape to close said passage, valve operating means for said valve members maintaining one valve member in closed position and the other valve member in open position and operable to reverse said valve members for sequential passage of fish past said valve members, a channelway communicating between each of the horizontal portions and the upstream side of the dam, and openable sealing means at the upstream side of said dam for closing and opening said channelways at selected times.

2. An interrupted passage fishway adapted to be mounted between the upstream side and the downstream side of a dam for migration of fish therethrough, comprising one or more sections disposed in end to end relation and each comprising an upright portion and a substantially horizontal portion, flow controlling means in each section including two valve members mounted in spaced relation, each of said valve members being of a size and shape to close said section, valve operating means for said valve members maintaining one valve member in closed position and the other valve member in open position and operable to reverse said valve members for sequential passage of fish past said valve members, and means in said valve members defining ports of a size to enable continual flow of water at least to a limited degree through said sections upstream of each valve member to a position downstream thereof, said ports being sufficiently enlarged to permit continual downstream and upstream migration of fingerlings.

3. The interrupted passage fishway of claim 2 wherein the ports in said valves are progressively smaller in size in the downstream direction.

4. The interrupted passage fishway of claim 2 including baffle means mounted in the downstream side of the valves in registry with but spaced from the ports to diffuse the flow of water through the said ports.

5. The interrupted passage fishway of claim 2 wherein said horizontal portions are open to atmosphere and there is included conduit means leading between said horizontal portions and the next upstream upright portion to supply water to the upper end of said horizontal portions in addition to water supplied through said valve members.

References Cited by the Examiner

UNITED STATES PATENTS

| | | | |
|---|---|---|---|
| 1,082,109 | 12/1913 | Collar | 61—21 |
| 2,094,892 | 10/1937 | Hurst | 61—21 |
| 2,121,968 | 6/1938 | Kuehl | 61—21 |
| 2,910,833 | 11/1959 | Pancheri | 61—21 |

EARL J. WITMER, *Primary Examiner.*